United States Patent Office 3,655,858
Patented Apr. 11, 1972

3,655,858
PROCESS FOR SHAPING FABRIC ARTICLES
Robert C. Wincklhofer and Gene C. Weedon, Richmond, Va., assignors to Allied Chemical Corporation, New York, N.Y.
No Drawing. Filed Feb. 24, 1969, Ser. No. 801,836
Int. Cl. B29c *13/00*
U.S. Cl. 264—230                                                8 Claims

ABSTRACT OF THE DISCLOSURE

A process for making specially shaped textile material or fabric articles such as garments, comprising the step of adapting a fabric composed at least in part of a novel fiber forming material containing at least two polymeric ingredients of differing melting points, and heating the fabric to shrink fit on said mold.

---

It has recently been discovered that certain novel fabric articles can be produced with highly desirable properties from fiber forming, filamentary materials composed of a plurality of polymeric substances. The best example of these multi-constituent filaments or yarn materials is the type produced in accordance with the description in Twilley, U.S. Patent 3,369,057, which patent is hereby incorporated herein by reference. In Twilley, multi-constituent filaments are disclosed having a nylon matrix with microfibers of polyester dispersed therein. The filaments were originally prepared for employment in high strength yarns useful in yarn or cord form as reinforcing strands in tires, belts, hoses and the like. Thereafter it was discovered that these same yarns could be employed to produce fabrics or textile materials capable of being heat-treated with all or part of the yarn or filaments fused together to cause the material to retain its shape or to produce other advantageous properties such as fatigue-resistance, wear-resistance, appearance, etc.

U.S. application Ser. No. 727,327 filed May 7, 1968 for "Dimensionally Stable Articles and Method of Manufacture" relates to the use of multi-constituent materials. In particular, it sets forth novel procedures for making shape stabilized articles by forming a fabric comprised of a multi-constituent fiber, placing the fabric in a mold and heating under conditions sufficient to fuse the multi-constituent filaments, i.e., by heating at or above the melting conditions of the matrix polymer. The multi-constituent blends and other related information is, therefore, pertinent to this invention and the entire application is hereby incorporated herein by reference.

The present invention, by way of comparison, involves the discovery that shaped, multi-constituent fabric articles can be produced without necessarily subjecting the fabric to fusion conditions, and without holding the fabric in a mold under force while heating. Thus, this invention relates to a method of making shaped, multi-constituent articles wherein a fabric composed entirely or partly of multi-constituent materials is placed over a mold and heated to produce shrinkage and thereby take the mold shape. The properties of the multi-constituent materials are such that upon removal from the mold, the fabric article will have acquired a relatively strict shape memory. The principal object of this invention is therefore to provide a method of economically making fabric articles capable of retaining their shape merely by adapting raw multi-constituent fabric to a mold, heat-treating, and removing. Other objects and advantages will be described in, or become apparent to one skilled in this art from, the appended claims and following description of the best mode of carrying out this invention and examples thereof.

In the preferred embodiment of this invention a textile material is prepared from multi-constituent filaments comprised of 50–90 parts by weight of at matrix-forming polyamide and 10–50 parts by weight polyester dispersed throughout the polyamide matrix. Preferably the polyamide is nylon 6 and the polyester is polyethylene terephthalate (70 to 30 parts by weight respectively), made in accordance with Example 1 in the Twilley patent referred to above. The term multi-constituent filament is used herein to mean a filament made by inclusion of at least one polymeric material in a matrix of at least one other as discontinuous fibrils, the dispersion having a higher melt temperature and either polymer optionally containing any secondary material compatible with the filament as a whole such as reinforcing materials, fillers, antioxidants, or other additives useful in producing a particular property, as well as those useful in such processes as spinning, extruding, polymerization, fabric forming, shaping, heat-treating or other product finishings. No less than 30% multi-constituent yarn should be used in any fabric to achieve good results. Preferably these filaments are drawn several times their original as-spun lengths to impart better shrinkages.

A 1 x 2 rib knit fabric in a tubular shape approximately equal to the shape of the mold desired was prepared using a 140/32 denier/filament multi-constituent yarn (70/30 nylon 6 and polyethylene terephthalate) in combination with commercially available nylon 6 (70/34 denier/filament) as separate ends. For example, in making a garment for a doll baby, the tubular shaped fabric is pulled over a temperature resistant mold the shape of a doll baby's body and subjected to a temperature (assuming standard conditions) of 180–220° C., 200–215° C. being the optimum range. The temperature to which the fabric is subjected being below the melting temperature (220° C.) of nylon 6, there is avoided fusion or flow of the nylon but which heat treatment is sufficient to effect substantial shrinkage of the multi-constituent yarn comprising 35% by weight of the fabric. The unique construction of multi-constituent yarn containing a higher melting microfibrillar dispersion is primarily responsible for its ability to retain shape. Thus heating the matrix to a softened state about the more temperature resistant dispersion yet without effecting any significant flow or deformation of the fabric structure, produces a phenomenal memory property. The time allowed for shinkage will vary depending on the results desired. Highly desirable properties can be achieved by varying the fabric construction, fabric materials, and heat-treating conditions, for example. In general the physical change of the material can be visually observed or the appropriate hand properties determined by preliminary trials, and the article withdrawn from heat-treatment as desired. In this example, heat-treatment at 212° C. for a period of 30 to 45 seconds should result in shirinkage about the mold, permanent mold shape retention upon removal by slipping off the mold in the same manner as slipped on, with a soft, pliable hand and slightly extensible body. Although below the melt temperature of nylon 6, softening thereof and some slight flow may occur. Preferably, the shaped material is subjected to a cooling medium to facilitate quicker removal from the mold. Thus a cooling air jet can be adapted to blow air through the mold and out apertures located at various points. Although another convenient method of facilitating removal is to expose the heated fabric article to water which has the unusual ability to cool and at the same time temporarily relax the shrink fit of the multi-constituent yarn so that the fabric can be easily removed. Thereafter, room conditions for a short period completely restores the memory property built in by the heat-treatment.

Instead of slipping the fabric over the mold for removal, it may be desirable to cut a vertical seam and remove, as where such a seam will serve as a garment opening and is modified to contain buttons, buttonholes, collars, ect. A complete garment may be formed by producing sleeves conventionally, or by shape forming as described above, and attached to the base or body member.

Non-woven webs are also particularly desirable for this invention, especially where inexpensive liner material containing the multi-constituent is employed in association with a more expensive or sensitive outer fabric. Thus, by using the former and heat-treating on a mold, the multi-constituent will promote shape retention of the laminate without visibly changing the outer cover material. A similar effect may be accomplished by combining the multi-constituent yarn with another by knitting a Swiss pique, for example, in such a manner that each surface is formed substantially entirely of one yarn or the other, and the multi-constituent side again being utilized as desired, i.e., on the inside or outside. Still further variations are desirable using multi-constituent yarn, for example, in pattern areas in a fabric, or isolated areas of a garment or other article where shape retention may be particularly desirable, as in the waist, axialla, neck, etc.

Example 1

A 70/30 nylon 6:polyethylene terephthalate polymer blend is melt spun in accordance with U.S. Patent 3,369,057 in a continuous operation. A non-woven web is formed by passing the filaments through apparatus similar to that described in Kinney, U.S. Patent 3,341,394, comprising a pneumatic "straight" jet to attenuate and selectively deposit said filaments. The jet is continuously supplied with 40 p.s.i.g. jet air pressure and caused to traverse across a received conveyor belt moving at 10 f.p.m. 37 times per minute. A web laid in this manner may be formed in tubular sections by heat-sealing ends together, e.g., by fusing with a heated platten at 225–250° C. depending on applied platten pressure, or otherwise formed around a mold and joined together. In any case, the web should at least be in light contact with the mold, and subjected to temperature of 210–215° C. under standard conditions, for approximately 20 seconds. An interliner for men's coats, for example, can be formed in this manner conveniently and economically.

Example 2

Separate ends of 1125/70, heart-shaped, multi-constituent yarns comprised of 80/20 nylon 6,6 polyethylene terephthalate and polypropylene denier 3750/210 round are fed as in Example 1 onto a collection conveyor traveling 14 f.p.m. A web weighing four ounces per square yard is produced containing 40 and 60 percent by weight of the two materials respectively. The web thus formed can be applied to a mold of any desired shape and shaped in accordance with the invention as described above.

Example 3

A 150 denier, 32 filament yarn composed of 15 weight percent polyester and 85 percent nylon 6 was formed according to the teachings of U.S. Patent 3,369,057. The yarn was converted into a tubular fabric on conventional knitting equipment using a circular knot pattern. The knitted tube was approximately 20 inches in diameter. A length of tube of about 40 inches was passed over a flat shaped mold corresponding to the shape of a man's trouser leg. The upper 8 inches of the tube was not in contact with the mold. An aluminum foil/asbestos composite was wrapped about the unsupported fabric and infra-red lamps were used to heat the shaped fabric to 200° C. for 20 seconds. The lamps were switched off and the fabric was cooled by means of an air jet to room temperature. The process was repeated to form a second shaped trouser leg. The insulated area at the top of each shaped leg was subsequently cut along one side for about 8 inches and placed in a press at 210° C. to form the upper portion of the trousers. Right and left hand molds were used to form the matching sides of the trousers. The opened sections of the tubes were then assembled by conventional sewing techniques to form a complete pair of trousers.

Example 4

A yarn composed of 4 inch staple lengths of a 30% polyester/70% nylon biconstituent fiber originally spun as an 840 denier/136 filament yarn was twisted using conventional equipment with a polyester fiber prepared in 4 inch lengths from an 840/140 yarn. The final composition of the yarn was 70% biconstituent yarn and 30% polyester yarn. The finished yarn was 1200 denier (4 cotton count) and had a 4.0 t.p.i. Z twist.

The above yarn was knitted into a tubular fabric using a circular knit to form a tube about 20 inches in diameter. The finished tube was passed over a heated form in the shape of a woman's torso. After 2 minutes at 210° C. the original tube had shrunk to the approximate dimensions of the form. The tube was air cooled with a jet and quickly slipped from the mold. A shaped, bulky fabric similar to that of a woman's torso was thus formed.

Appropriate cutting and sewing of the shaped article can produce a form fitting sweater or other garment.

Various materials can be employed in the multi-constituent yarns as pointed out in the above-reference Twilley patent and application Ser. No. 727,327. Still other variations and modifications of the materials used, and manner of combining same, conditions, application to mold, etc., are contemplated without departing from the spirit and scope of the invention.

We claim:

1. The method for the production of a shaped fabric article having a relatively strict shape memory comprising the steps of:
    (a) providing fabric material comprised of a plurality of heat-shrinkable multi-constituent filaments comprising at least about 30% by weight of the fabric material, said filaments being spun from at least two different polymeric materials such that, in a given filament, a fiber-forming polyamide defines a matrix and a polyester is dispersed therein in the form of discontinuous fibrils, said matrix comprising about 50%–90% by weight of the filament and having a lower melting point than said dispersed polyester fibrils; said dispersed polyester fibrils comprising about 10%–50% by weight of the filament, said filaments having been previously drawn several times their original as-spun length;
    (b) adapting said fabric material to the configuration of a mold surface, in the absence of such force that the heat-shrink of the step (c) is imparted; and
    (c) heat shrinking the adapted fabric material at a temperature in the range above the softening point of the matrix polymer of the said multi-constituent filaments but below that point where significant flow and deformation thereof is effected, and to such extent that the fabric assumes the dimensions of the said mold surface, thereby providing an article having the ability to remember shape.

2. A method as defined in claim 1 wherein said multi-constituent filaments are comprised of 50–90 parts by weight of nylon 6 and 50–10 parts by weight of polyethylene terephthalate.

3. A method as defined in claim 2 wherein said fabric is heated and shrunk at a temperature of from 180 to 220° C.

4. A method as defined in claim 2 wherein said fabric is heated and shrunk at a temperature of from 200 to 215° C.

5. A method as defined in claim 1 wherein said fabric is comprised of multi-constituent material located in isolated areas where shrinkage shape retention is particularly desirable.

6. A method as defined in claim 1 wherein said multi-constituent filaments are formed on one side of the fabric.

7. A method as defined in claim 1 wherein said fabric is a non-woven web.

8. A method as defined in claim 1 further comprising the step of moistening said fabric prior to removing from said mold.

References Cited
UNITED STATES PATENTS
3,369,057  2/1968  Twilley _____ 260—857

ROBERT F. BURNETT, Primary Examiner

R. L. MAY, Assistant Examiner

U.S. Cl. X.R.

161—70, 176; 264—324